(12) United States Patent
Kitagawa et al.

(10) Patent No.: US 11,549,892 B2
(45) Date of Patent: Jan. 10, 2023

(54) AIR TREATMENT DEVICE

(71) Applicant: DAIKIN INDUSTRIES, LTD., Osaka (JP)

(72) Inventors: Keita Kitagawa, Osaka (JP); Youichi Handa, Osaka (JP); Masaya Nishimura, Osaka (JP); Yoshiteru Nouchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/675,569

(22) Filed: Feb. 18, 2022

(65) Prior Publication Data

US 2022/0170864 A1 Jun. 2, 2022

Related U.S. Application Data

(63) Continuation of application No. PCT/JP2020/020277, filed on May 22, 2020.

(30) Foreign Application Priority Data

Aug. 21, 2019 (JP) .............................. JP2019-151451

(51) Int. Cl.
 *F24F 13/20* (2006.01)
 *G01N 21/88* (2006.01)
 (Continued)

(52) U.S. Cl.
 CPC ......... *G01N 21/8806* (2013.01); *F24F 13/20* (2013.01); *F24F 13/222* (2013.01); *G01N 21/9018* (2013.01)

(58) Field of Classification Search
 CPC .... F24F 13/20; F24F 13/222; G01N 21/8806; G01N 21/9018
 (Continued)

(56) References Cited

U.S. PATENT DOCUMENTS

2010/0045168 A1 2/2010 Su et al.
2020/0003449 A1 1/2020 Morikawa et al.
(Continued)

FOREIGN PATENT DOCUMENTS

CN 207936373 U 10/2018
EP 3 330 643 A1 6/2018
(Continued)

OTHER PUBLICATIONS

Lighting Research Center, Lighting Answers, How is white light made with LEDs?, Jun. 21, 2013, https://www.lrc.rpi.edu/programs/nlpip/lightinganswers/led/whitelight.asp (Year: 2013).*
(Continued)

*Primary Examiner* — Avinash A Savani
*Assistant Examiner* — Dana K Tighe
(74) *Attorney, Agent, or Firm* — Birch, Stewart, Kolasch & Birch, LLP

(57) ABSTRACT

An air treatment device includes a casing, a drain pan provided in the casing, a camera configured to capture an inner surface of the drain pan to obtain image data, and a lighting device configured to apply, to a photographing target of the camera, visible light having a maximum peak wavelength in a wavelength band from 400 nm to 500 nm.

12 Claims, 13 Drawing Sheets

(51) Int. Cl.
  *F24F 13/22* (2006.01)
  *G01N 21/90* (2006.01)
(58) Field of Classification Search
  USPC .................................................... 396/6, 661
  See application file for complete search history.

(56) References Cited

U.S. PATENT DOCUMENTS

| 2020/0173670 A1 | 6/2020 | Suzuki et al. |
| 2020/0248918 A1 | 8/2020 | Handa et al. |
| 2020/0248924 A1 | 8/2020 | Suzuki et al. |
| 2021/0131690 A1 | 5/2021 | Suzuki et al. |

FOREIGN PATENT DOCUMENTS

| EP | 3 370 885 A1 | 9/2018 | |
| EP | 3 896 352 A1 | 10/2021 | |
| JP | 2004324932 A | * 11/2004 | .............. F24F 13/22 |
| JP | 2007-255840 A | 10/2007 | |
| JP | 2010-50438 A | 3/2010 | |
| JP | 2017-120200 A | 7/2017 | |
| JP | 2019-39657 A | 3/2019 | |
| JP | 2019-39658 A | 3/2019 | |
| WO | WO 2017/149883 A1 | 9/2017 | |
| WO | WO 2019/044145 A1 | 3/2019 | |

OTHER PUBLICATIONS

International Search Report for PCT/JP2020/020277 dated Aug. 4, 2020.

Written Opinion of the International Searching Authority for PCT/JP2020/020277 (PCT/ISA/237) dated Aug. 4, 2020.

English translation of the International Preliminary Report on Patentability and Written Opinion of the International Searching Authority for International Application No. PCT/JP2020/020277, dated Mar. 3, 2022.

Extended European Search Report for European Application No. 20855403.0, dated Aug. 31, 2022.

* cited by examiner

AIR TREATMENT DEVICE

CROSS REFERENCE TO RELATED APPLICATIONS

This application is a Continuation of PCT International Application No. PCT/JP2020/020277, filed on May 22, 2020, which claims priority under 35 U.S.C. 119(a) to Patent Application No. 2019-151451, filed in Japan on Aug. 21, 2019, all of which are hereby expressly incorporated by reference into the present application.

TECHNICAL FIELD

The present disclosure relates to an air treatment device.

BACKGROUND ART

There has been conventionally known an air treatment device including a photographing device configured to photograph an interior of a casing. The photographing device in this air treatment device photographs, as a photographing target, a constituent component such as a drain pan. A service provider or the like can observe a dirtied state of a photographing target based on image data obtained through photographing by the photographing device. The air treatment device thus configured is exemplarily disclosed in Patent Literature 1.

CITATION LIST

Patent Literature

Patent Literature 1: JP 2019-039657 A

SUMMARY

The present disclosure has a first aspect relating to an air treatment device including: a casing (20); a tray (50) provided in the casing (20) and configured to receive water; a photographing device (70) configured to photograph a photographing target including an inner surface of the tray (50) to obtain image data; and a lighting device (72) configured to apply, to the photographing target of the photographing device (70), visible light having a maximum peak wavelength in a wavelength band from 400 nm to 500 nm.

DESCRIPTION OF EMBODIMENTS

Embodiment 1

Figure 1:
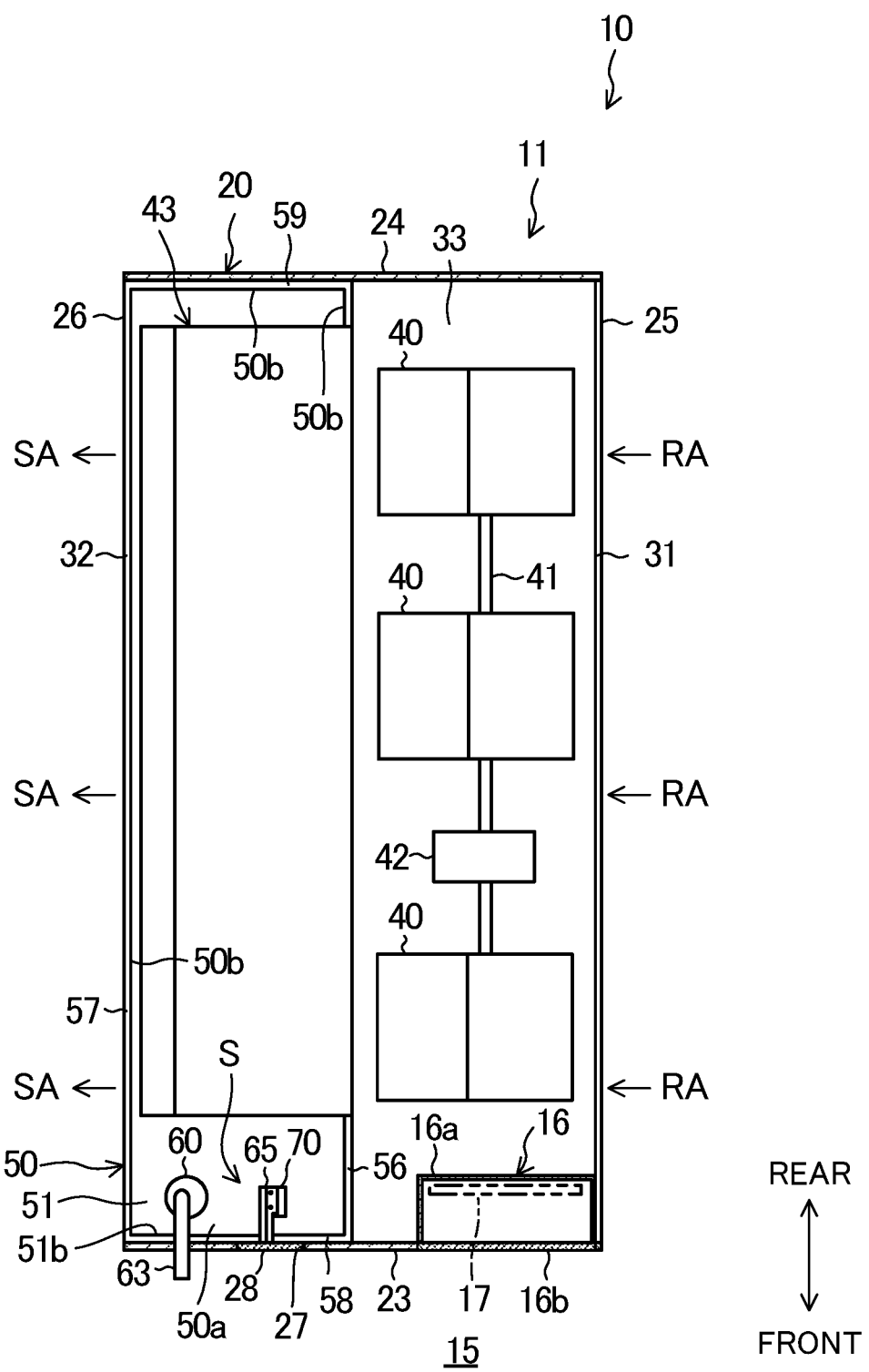
FIG. 1 is a plan view depicting an internal structure of an air conditioner according to embodiment 1.
Figure 2:
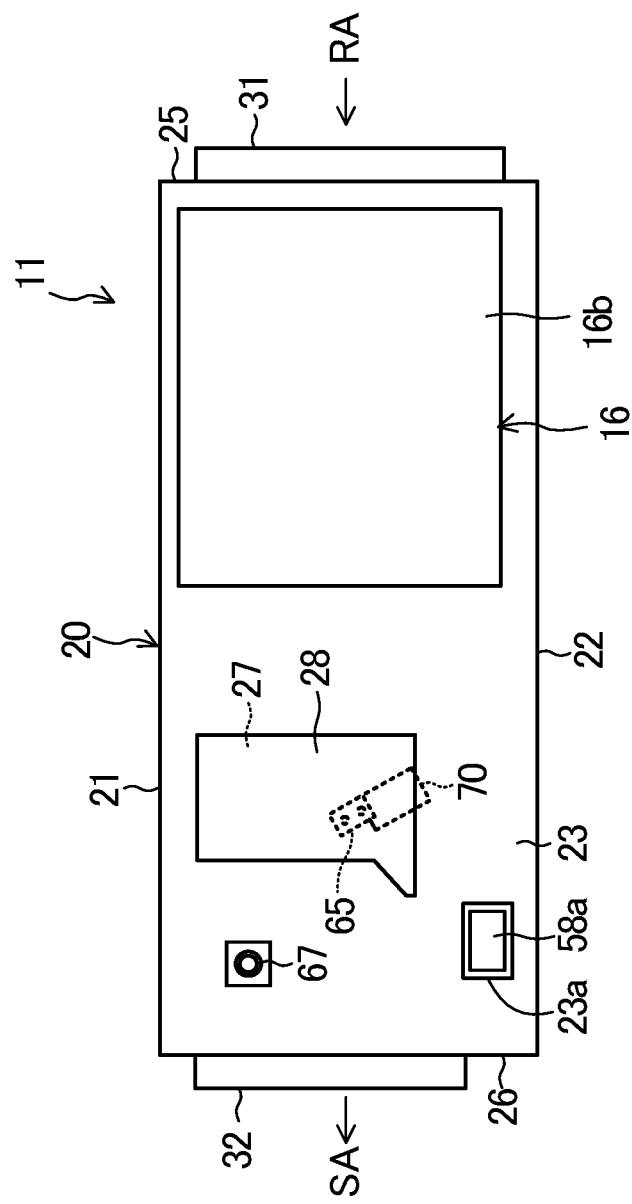
FIG. 2 is a front view of the air conditioner according to embodiment 1.

Description is made to embodiment 1.

An air treatment device according to embodiment 1 is an air conditioner (1) configured to adjust at least indoor temperature. The air conditioner (10) adjusts temperature of indoor air (RA) and supplies an indoor space with air having adjusted temperature as supply air (SA). The air conditioner (10) is configured to execute cooling operation and heating operation. The air conditioner (10) photographs an interior of a drain pan (50) and supplies a service provider or a user with image data obtained through photographing.

The air conditioner (10) includes an indoor unit (11) and an outdoor unit (not depicted). The indoor unit (11) is installed in a ceiling space. The indoor unit (11) is connected to the outdoor unit via a refrigerant pipe. This connection constitutes a refrigerant circuit in the air conditioner (10). The refrigerant circuit is connected with a compressor, an outdoor heat exchanger, an expansion valve, and an indoor heat exchanger (43). The refrigerant circuit has refrigerant circulation to achieve a vapor compression refrigeration cycle.

In the refrigerant circuit, a first refrigeration cycle and a second refrigeration cycle are switched. The first refrigeration cycle is achieved during cooling operation. When the first refrigeration cycle is achieved, the outdoor heat exchanger serves as a radiator or a condenser whereas the indoor heat exchanger (43) serves as an evaporator. The second refrigeration cycle is achieved during heating operation. When the second refrigeration cycle is achieved, the indoor heat exchanger (43) serves as a radiator or a condenser whereas the outdoor heat exchanger serves as an evaporator.

<Configuration of Indoor Unit>

The indoor unit (11) will be described in terms of its schematic configuration with reference to FIG. 1 to FIG. 4. The indoor unit (11) is installed behind a ceiling. The indoor unit (11) includes a casing (20), a fan (40), the indoor heat exchanger (43), the drain pan (50), a drain pump (60), an electric component box (16), and a photographing system (S). The casing (20) accommodates the fan (40), the indoor heat exchanger (43), the drain pan (50), the drain pump (60), and the electric component box (16).

<Casing>

The casing (20) has a rectangular parallelepiped hollow box shape. The casing (20) includes a top panel (21), a bottom plate (22), a front panel (23), a rear panel (24), a first side plate (25), and a second side plate (26). The front panel

(23) and the rear panel (24) face each other. The first side plate (25) and the second side plate (26) face each other.

The first side plate (25) is provided with an intake port (31). The intake port (31) is connected with an intake duct (not depicted). The intake duct has an inflow end communicating with the indoor space. The second side plate (26) is provided with a blow-out port (32). The blow-out port (32) is connected with a blow-out duct (not depicted). The blow-out duct has an outflow end communicating with the indoor space. In the casing (20), an air flow path (33) is provided between the intake port (31) and the blow-out port (32).

The front panel (23) faces a maintenance space (15). The maintenance space (15) is a work space for the service provider or the like. The front panel (23) has a portion adjacent to the blow-out port (32) and provided with an inspection port (27). The inspection port (27) is positioned close to an upper end of the front panel (23). The inspection port (27) is detachably provided with an inspection lid (28). The service provider or the like detaches the inspection lid (28) to visually recognize an interior of the casing (20) via the inspection port (27).

The front panel (23) has the portion adjacent to the blow-out port (32) and provided with an opening (23a). The opening (23a) is positioned in a lower portion of the front panel (23). The opening (23a) exemplarily has a rectangular shape. An inspection window (58a) of the drain pan (50) is positioned on an opposite side (inside the casing (20)) of an outside of the casing (20) with respect to the opening (23a). The opening (23a) exposes, to outside the casing (20), the inspection window (58a) of the drain pan (50).

<Fan>

The fan (40) is disposed adjacent to the first side plate (25) on the air flow path (33) in the casing (20). The present embodiment provides three fans (40) on the air flow path (33). Each of the fans (40) is configured as a sirocco fan. The three fans (40) are coupled to one another by a shaft (41). The three fans (40) are driven by a single motor (42).

<Indoor Heat Exchanger>

The indoor heat exchanger (43) is disposed adjacent to the second side plate (26) on the air flow path (33) in the casing (20). The indoor heat exchanger (43) is exemplarily of a fin and tube type. The indoor heat exchanger (43) according to the present embodiment is provided to have an oblique posture (see FIG. 3). The indoor heat exchanger (43) cools air while the first refrigeration cycle is achieved. In this case, moisture in the air dew condenses to generate condensate water. The indoor heat exchanger (43) heats air while the second refrigeration cycle is achieved.

<Drain Pan>

The drain pan (50) will be described in detail with reference to FIG. 1, FIG. 3, FIG. 4, and FIG. 6. The drain pan (50) is disposed adjacent to the second side plate (26) on the air flow path (33) in the casing (20). The drain pan (50) is installed at the bottom plate (22) of the casing (20). The drain pan (50) is positioned below the indoor heat exchanger (43). The drain pan (50) exemplifies a tray configured to receive water. The drain pan (50) receives condensate water generated in air adjacent to the indoor heat exchanger (43) in the casing (20).

The drain pan (50) includes a bottom plate portion (51), a first side wall (56), a second side wall (57), a third side wall (58), and a fourth side wall (59).

The bottom plate portion (51) has a surface (upper surface in FIG. 3) constituting a bottom surface (50a) facing the indoor heat exchanger (43). The bottom surface (50a) is provided with a concave portion (53) concaved downward. The concave portion (53) is positioned close to a front end of the bottom plate portion (51). The concave portion (53) has a bottom surface corresponding to the lowest portion in the bottom surface (50a) of the drain pan (50). The bottom surface (50a) is slightly oblique to allow water in the drain pan (50) to flow into the concave portion (53). The bottom surface (50a) is provided with a groove (not depicted) configured to guide water into the concave portion (53).

The first side wall (56) is positioned upstream of the indoor heat exchanger (43) on the air flow path (33). The first side wall (56) extends upward from an upstream end edge of the bottom plate portion (51). The second side wall (57) is positioned downstream of the indoor heat exchanger (43). The second side wall (57) extends upward from a downstream end edge of the bottom plate portion (51). The first side wall (56) and the second side wall (57) face each other. A surface (left surface in FIG. 1 and FIG. 3) of the first side wall (56) and a surface (right surface in FIG. 1 and FIG. 3) of the second side wall (57) each constitute a side surface (50b) directed to an inside of the drain pan (50).

The third side wall (58) is positioned behind the front panel (23) (inside the casing (20)). The third side wall (58) extends upward from the front end of the bottom plate portion (51). The third side wall (58) extends to reach a front end of the first side wall (56) as well as a front end of the second side wall (57). The fourth side wall (59) is positioned behind the rear panel (24). The fourth side wall (59) extends upward from a rear end of the bottom plate portion (51). The fourth side wall (59) extends to reach a rear end of the first side wall (56) as well as a rear end of the second side wall (57). A surface (upper surface in FIG. 1) of the third side wall (58) and a surface (lower surface in FIG. 1) of the fourth side wall (59) each constitute the side surface (50b) directed to the inside of the drain pan (50).

Figure 3:
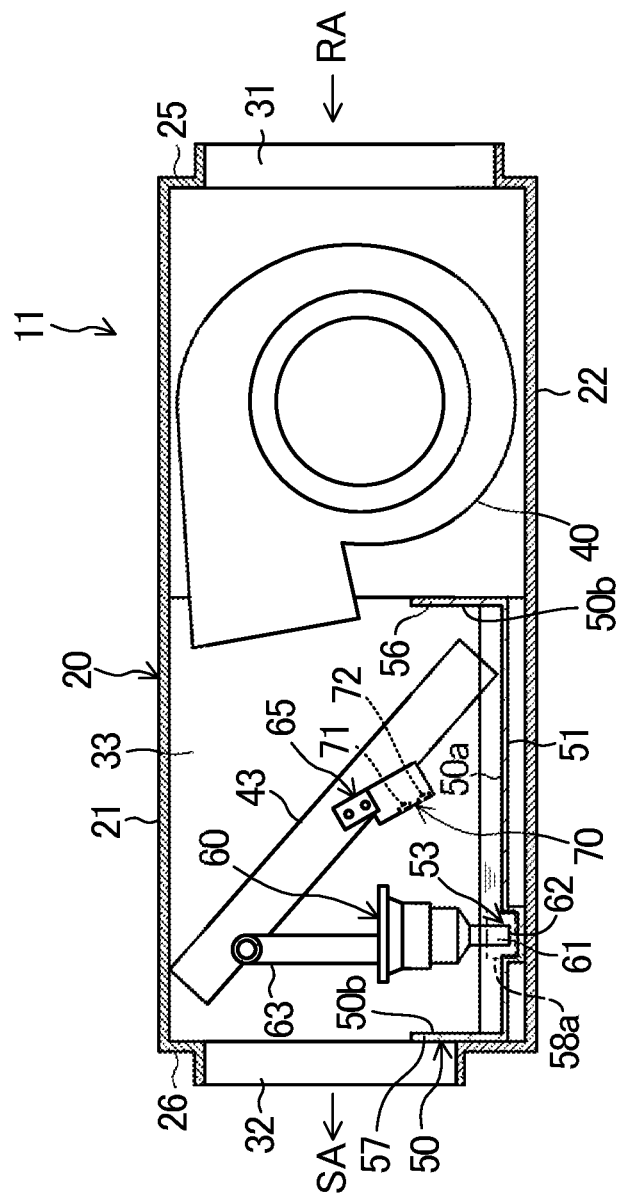
FIG. 3 is a longitudinal sectional view depicting the internal structure of the air conditioner according to embodiment 1.
Figure 4:
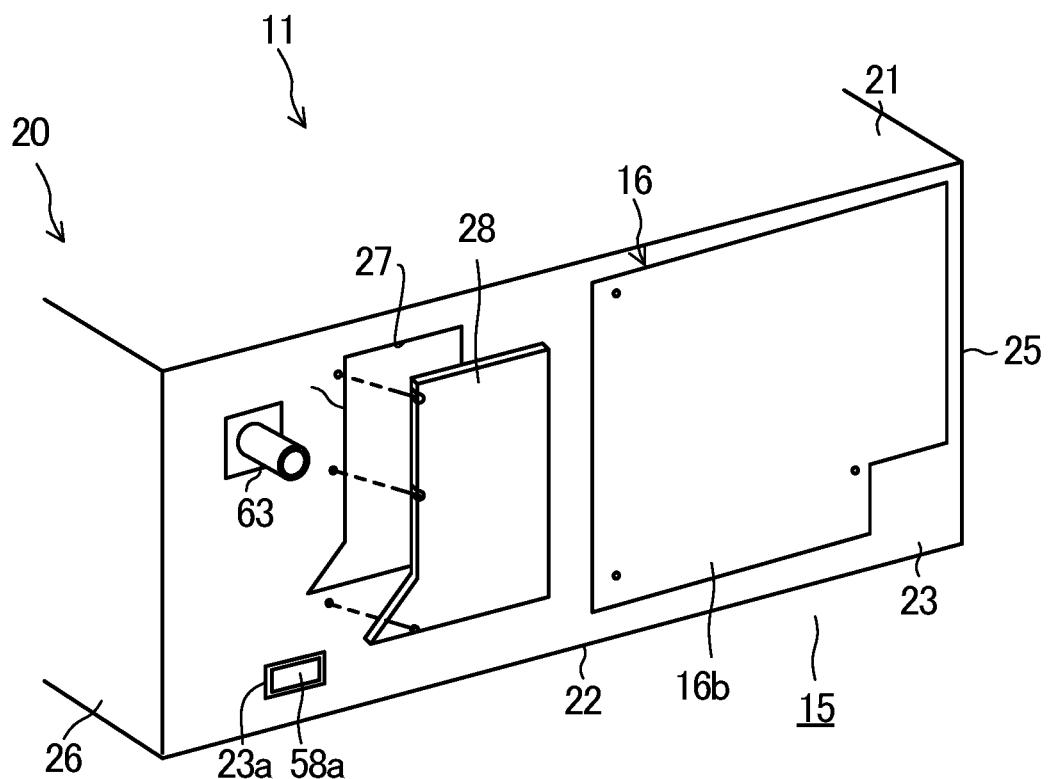
FIG. 4 is a perspective view depicting a schematic front configuration of the air conditioner according to embodiment 1.
Figure 6:
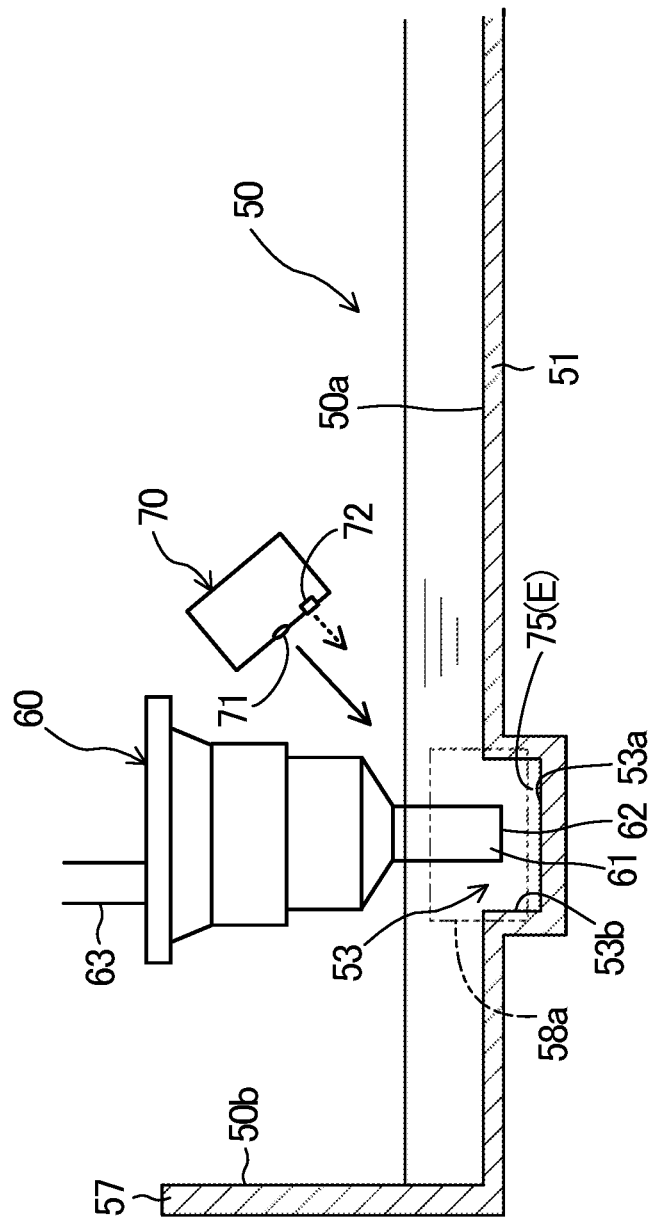
FIG. 6 is a sectional view depicting schematic configurations of a principal part and its periphery of a drain pan according to embodiment 1.
Figure 7:
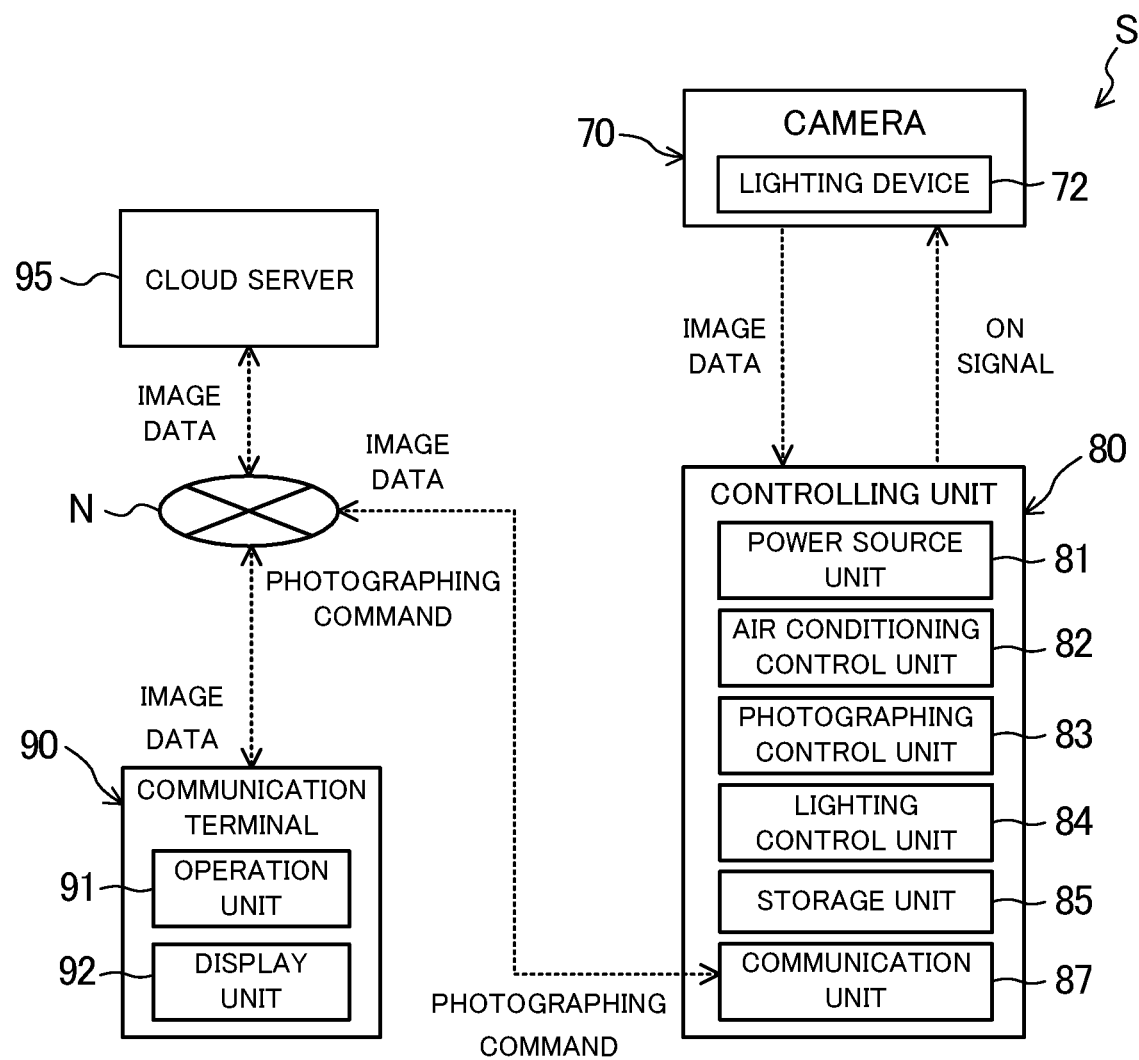
FIG. 7 is a block diagram depicting a schematic configuration of a photographing system according to embodiment 1.

As indicated by a two-dot chain line in FIG. 3 and FIG. 6, the third side wall (58) is provided with the inspection window (58a). The inspection window (58a) exemplarily has a rectangular shape. The inspection window (58a) is made of a transparent or semitransparent material. The concave portion (53) of the drain pan (50) is positioned behind the inspection window (58a) (inside the drain pan (50)). Furthermore, an intake portion (61) of the drain pump (60) is positioned behind the inspection window (58a).

The inspection window (58a) is exposed to the outside via the opening (23a) of the casing (20). The opening (23a) of the casing (20), the inspection window (58a) and the concave portion (53) of the drain pan (50), and the intake portion (61) of the drain pump (60) positionally correspond to one another when viewed in a thickness direction of the front panel (23). The service provider or the like can visually recognize, from outside via the opening (23a) of the casing (20) and the inspection window (58a) of the drain pan (50), an interior of the concave portion (53) of the drain pan (50) and the intake portion (61) of the drain pump (60).

The drain pan (50) is made of a resin material. The drain pan (50) is white on at least an inner surface. The "white" color herein includes pure white as well as white containing slight tint color such as whitewash color, snow white, unbleached color, or off-white. The "white" color preferably has 245 or more as each of R luminance, G luminance, and B luminance in an RGB color space. Such a white color of the inner surface of the drain pan (50) has relatively high brightness. The inner surface of the drain pan (50) includes the bottom surface (50a) and the side surface (50b). At least the bottom surface (50a) in the inner surface of the drain pan (50) is a photographing target of a camera (70) constituting the photographing system (S).

<Drain Pump>

The drain pump (60) is disposed above the drain pan (50). The drain pump (60) is disposed behind the third side wall (58) (inside the drain pan (50)) in the drain pan (50). The drain pump (60) is configured to exhaust water in the drain pan (50). The drain pump (60) has a lower portion provided with the intake portion (61) for water intake. The intake portion (61) is constituted by a pipe body. The intake portion (61) is disposed in the concave portion (53) of the drain pan (50). The intake portion (61) has a lower end provided with a water intake port (62) configured to receive a water flow. The water intake port (62) is opened toward the bottom surface of the concave portion (53).

The drain pump (60) has an upper portion connected with a drain pipe (63). The drain pipe (63) communicates with a discharge side of the drain pump (60). The drain pipe (63) horizontally penetrates an upper portion of the front panel (23) of the casing (20). When the drain pump (60) operates, water accumulated in the drain pan (50) is sucked into the intake portion (61) of the drain pump (60). The water sucked into the intake portion (61) is discharged from the drain pump (60) and is exhausted to outside the casing (20) through the drain pipe (63). The intake portion (61) of the drain pump (60) and the bottom surface (50a) pf the drain pan (50) are included in the photographing target of the camera (70).

<Electric Component Box>

As depicted in FIG. 1, the electric component box (16) is disposed close to the fan (40) on the front panel (23). The electric component box (16) accommodates a printed circuit board (17). The printed circuit board (17) is equipped with a power source circuit, an electronic component, and a control circuit. The electric component box (16) includes a box body (16a) having a front opened surface, and an electric component lid (16b) configured to open or close the opened surface of the box body (16a). The electric component lid (16b) constitutes part of the front panel (23). The service provider or the like detaches the electric component lid (16b) to expose an interior of the electric component box (16) to the maintenance space (15).

<Photographing System>

The photographing system (S) includes the camera (70), a lighting device (72), a controlling unit (80), and a communication terminal (90). The camera (70) is accommodated in the casing (20). The controlling unit (80) is constituted by the printed circuit board (17) disposed in the electric component box (16). The camera (70) and the controlling unit (80) are connected via a cable. The communication terminal (90) is owned by the service provider or the user. The controlling unit (80) may alternatively be disposed outside the electric component box (16), separately from the printed circuit board (17).

The camera (70) is a photographing device configured to photograph a constituent component provided in the casing (20). Examples of the camera (70) include an ordinary camera configured to photograph by capturing visible light. The camera (70) obtains image data of the photographing target. The photographing target of the camera (70) is the interior of the drain pan (50). The photographing target includes the concave portion (53) and the peripheral bottom surface (50a) of the drain pan (50), and the intake portion (61) of the drain pump (60). The camera (70) includes a lens (71). The lens (71) is of a wide angle type or a fisheye type.

Figure 5:
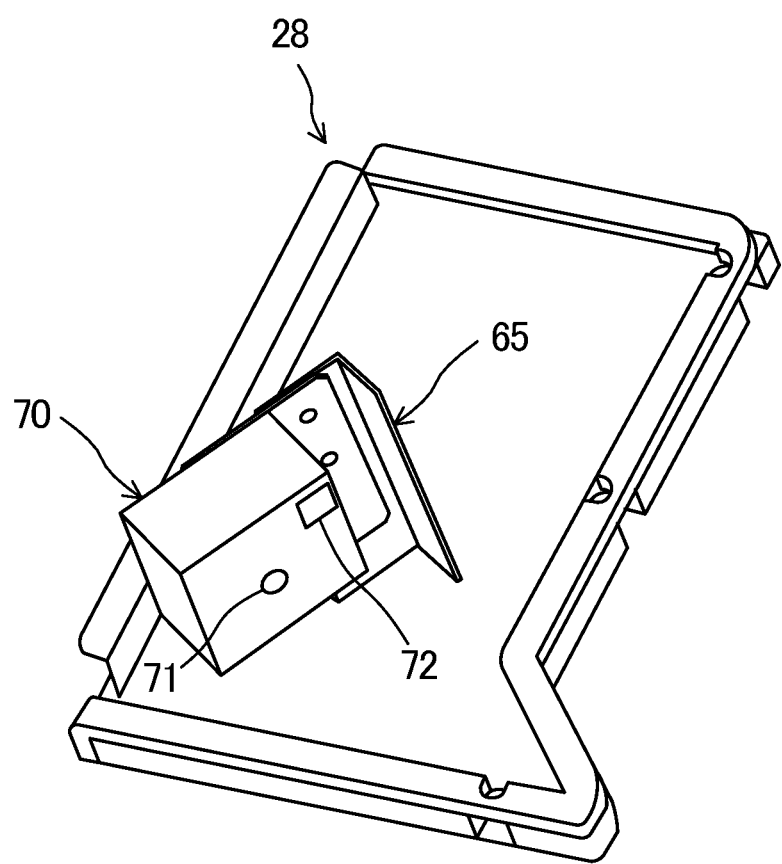
FIG. 5 is a perspective view depicting an inner structure of an inspection lid according to embodiment 1.

As depicted in FIG. 5, the camera (70) is attached to the inspection lid (28) by means of a stay (65). The stay (65) is a support member for the camera (70). The stay (65) is provided on a rear surface of the inspection lid (28). The stay (65) has a proximal end fixed to the rear surface of the inspection lid (28) by welding or the like. The camera (70) is detachably attached to a distal end of the stay (65). When the inspection lid (28) is attached to the inspection port (27), the camera (70) has a photographing posture directed obliquely downward toward the second side plate (26).

The lens (71) of the camera (70) having the photographing posture is directed to the interior of the drain pan (50). The lens (71) has an optical axis directed to the concave portion (53) of the drain pan (50). The camera (70) captures a region including at least the concave portion (53) and the peripheral bottom surface (50a) in the inner surface of the drain pan (50). The camera (70) further captures the intake portion (61) of the drain pump (60). Image data obtained through photographing with use of the camera (70) includes the concave portion (53) of the drain pan (50) and the intake portion (61) of the drain pump (60).

The lighting device (72) is provided integrally with the camera (70). The lighting device (72) applies visible light to the photographing target at least upon photographing with use of the camera (70). The lighting device (72) has a position and an angle set to apply visible light to photographing regions of the drain pan (50) and the drain pump (60) when the camera (70) has the photographing posture. The lighting device (72) has a visible light emitting period (lighting period) that can be adjusted appropriately.

Figure 8:
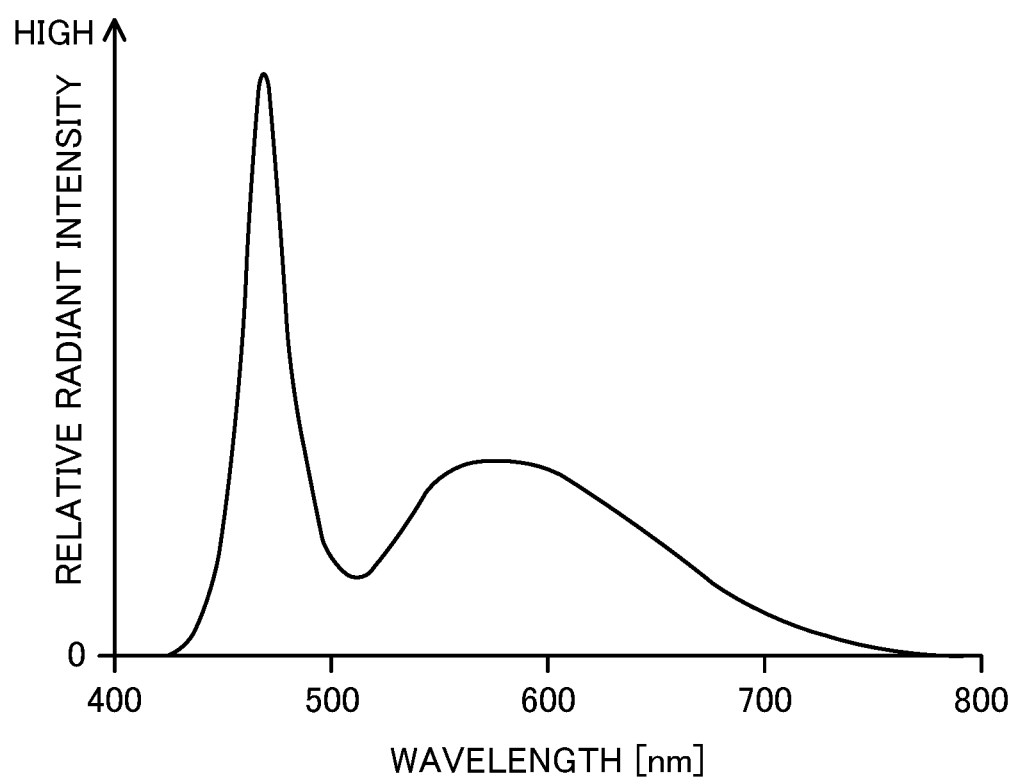
FIG. 8 is a graph indicating spectral distribution properties of visible light emitted from a lighting device according to embodiment 1.

The lighting device (72) is a white LED. The white LED adopted as the lighting device (72) is of a type combining a blue LED and a yellow phosphor. The LED of this type is also called a pseudo white LED. Visible light emitted from the lighting device (72) to the photographing target is white light having a spectral distribution property as indicated in FIG. 8. The visible light has a maximum peak wavelength in a wavelength band from 400 nm to 500 nm (hereinafter, also referred to as "short wavelength band").

The controlling unit (80) includes a power source unit (81), an air conditioning control unit (82), a photographing control unit (83), a lighting control unit (84), a storage unit (85), and a communication unit (87). The air conditioning control unit (82), the photographing control unit (83), and the lighting control unit (84) are each constituted by a microcomputer and a memory device configured to store software for operation of the microcomputer.

The power source unit (81) constitutes a power source of the camera (70). The power source unit (81) supplies the camera (70) with electric power via the cable. The power source unit (81) also constitutes a power source of the lighting device (72). The power source unit (81) may alternatively serve as a power source of any device other than the camera (70) and the lighting device (72).

The air conditioning control unit (82) controls constituent devices such as the fan (40) and the drain pump (60) of the air conditioner (10). The air conditioning control unit (82) operates the drain pump (60) when the air conditioner (10) starts cooling operation. The air conditioning control unit (82) stops the drain pump (60) when cooling operation stops. The drain pump (60) is basically in an operating state during cooling operation.

The photographing control unit (83) controls photographing operation of the camera (70). The photographing control unit (83) controls at least photographing timing as to the photographing operation of the camera (70). The photographing control unit (83) outputs an ON signal to cause the camera (70) to capture based on a photographing command received from the communication terminal (90). When the camera (70) receives the ON signal, the camera (70) captures. The camera (70) captures to obtain image data of the photographing target. The image data is inputted to the controlling unit (80) via the cable.

The lighting control unit (84) controls lighting operation of the lighting device (72). The lighting control unit (84) controls at least lighting timing and a lighting period as to the lighting operation of the lighting device (72). When the camera (70) captures, the lighting control unit (84) controls the lighting device (72) to apply visible light at predetermined timing for a predetermined period.

The storage unit (85) stores the image data obtained through photographing with use of the camera (70). The storage unit (85) can be constituted by various memory devices such as a semiconductor memory. The communication unit (87) transmits the image data stored in the storage unit (85) to a cloud server (95) via a network (N). The cloud server (95) stores the image data thus received.

The communication unit (87) is connected to the cloud server (95) via the network (N). The communication unit (87) is connected to the network (N) by means of wireless communication or the like. The communication unit (87) and the network (N) are connected based on a mobile high-speed communication technique (long time evolution: LTE) or the like. The communication unit (87) may alternatively be connected wiredly to the network (N).

The communication terminal (90) is constituted by a smartphone, a tablet terminal, a mobile phone, a personal computer, or the like. The communication terminal (90) is connected to the cloud server (95) via the network (N). The communication unit (87) and the network (N) are connected based on the mobile high-speed communication technique (LTE) or the like. The communication terminal (87) may alternatively be connected wiredly to the network (N).

The communication terminal (90) includes an operation unit (91) and a display unit (92). The operation unit (91) is constituted by a keyboard, a touch panel, or the like. The service provider, the user, or the like operates the operation unit (91) to operate predetermined application software. This application software is configured to cause the camera (70) to capture, and download image data obtained through photographing from the cloud server (95) to the communication terminal (90), via the network (N).

The display unit (92) is constituted by a liquid crystal display, an organic electro-luminescence (EL) display, or the like. The display unit (92) appropriately displays the image data obtained through photographing with use of the camera (70) based on operation of the application software. The service provider or the user can appropriately grasp, based on information such as an image displayed on the display unit (92), a dirtied state of the concave portion (53) and the peripheral bottom surface (50a) of the drain pan (50) and a dirtied state of the intake portion (61) of the drain pump (60).

The dirtied state of the interior of the drain pan (50) is checked by means of the photographing system (S), through manual operation of the communication terminal (90) by the service provider or the user.

Specifically, the service provider or the user operates the communication terminal (90) to input a photographing command on the application software. The photographing command is thus outputted from the communication terminal (90) to the controlling unit (80) via the network (N). When the controlling unit (80) receives the photographing command, the photographing control unit (83) causes the camera (70) to capture. Upon photographing, the lighting device (72) operates to apply visible light having a peak wavelength in a short wavelength band to the photographing target in the drain pan (50) (the concave portion (53) and the peripheral bottom surface (50a) of the drain pan (50) and the intake portion (61) of the drain pump (60)). Photographing in such a lighting environment leads to obtaining image data of the photographing target in the drain pan (50) at timing requested by the service provider or the user.

The communication unit (87) transmits, to the cloud server (95) via the network (N), the image data thus obtained along with ID information (photographing date and time, a type of the air conditioner (10) having photographed, and the like), which are to be stored in the cloud server (95). The service provider or the user can check, on the display unit (92), the image data stored in the cloud server (95) via the network (N) or by downloading the image data to the communication terminal (90). The service provider or the user can then grasp dirtied degrees of the inner surface of the drain pan (50) and the intake portion (61) of the drain pump (60), pollution of condensate water, a water level in the drain pan (50), whether or not the drain pipe (63) is clogged, whether or not the drain pump (60) is in trouble, and the like.

Dirt adhering to the inner surface of the drain pan (50) is often a biofilm or the like having pale pink, pale brown, or pale yellow. Such dirt is similar in color tone to the inner surface of the drain pan (50). It may thus be difficult to specify dirt on image data if the inner surface of the drain pan (50) is photographed with use of the camera (70) in a lighting environment of applying visible light having the maximum peak wavelength in a wavelength band (a mid wavelength band or a long wavelength band) other than the short wavelength band, or under natural light.

The air conditioner (10) according to embodiment 1 photographs the inner surface of the drain pan (50) with use of the camera (70) in a lighting environment where the lighting device (72) applies visible light having the maximum peak wavelength in the short wavelength band. Dirt in pale pink, pale brown, or pale yellow tending to adhere to the inner surface of the drain pan (50) absorbs most of maximum peak wavelength components of the visible light emitted from the lighting device (72). In the image data obtained through photographing with use of the camera (70), a portion including the dirt is accordingly lower in brightness than a remaining portion not including such dirt, and the portion having the dirt has a relatively deep color. It is thus easy to specify the dirtied state of the inner surface of the drain pan (50) based on the image data.

In the air conditioner (10) according to embodiment 1, the inner surface of the drain pan (50) is white. In the image data obtained through photographing with use of the camera (70), the portion including the inner surface of the drain pan (50) having no dirt is accordingly relatively high in brightness. The image data thus has a significant difference in brightness between the portion having dirt in pale pink, pale brown, or pale yellow and the portion not having such dirt on the inner surface of the drain pan (50). The image data can thus clearly depict the dirt adhering to the inner surface of the drain pan (50).

In the air conditioner (10) according to embodiment 1, the bottom surface (50a) of the drain pan (50) is photographed with use of the camera (70). The bottom surface (50a) of the drain pan (50) tends to have accumulated water and is thus likely to have dirt such as a biofilm. The dirtied state of the inner surface of the drain pan (50) can thus be grasped based on image data obtained through photographing the bottom surface (50a) of the drain pan (50).

In the air conditioner (10) according to embodiment 1, the concave portion (53) provided in the bottom surface (50a) of the drain pan (50) is photographed with use of the camera (70). The concave portion (53) forms the lowest portion in the bottom surface (50a) of the drain pan (50) and thus tends to have accumulated water to be likely to have dirt such as a biofilm. It is accordingly possible to grasp the dirtied state of the inner surface of the drain pan (50) based on image data obtained through photographing the concave portion (53) of the drain pan (50).

In the air conditioner (10) according to embodiment 1, the intake portion (61) of the drain pump (60) is photographed with use of the camera (70). Dirt such as a biofilm sometimes adheres also to the intake portion (61) of the drain pump (60) disposed in the drain pan (50). When the photographing target of the camera (70) includes the intake portion (61) of the drain pump (60), it is possible to grasp also the dirtied state of the intake portion (61) of the drain pump (60) based on image data obtained through the photographing.

The air conditioner (10) according to embodiment 1 adopts the white LED as the lighting device (72). This white LED emits white light having a maximum peak wavelength in a wavelength band from 400 nm to 500 nm. Based on image data obtained through photographing with use of the camera (70) in a lighting environment of applying such white light, it is easy to grasp, as to the dirtied states of the inner surface of the drain pan (50) and the intake portion (61) of the drain pump (60), dirt in pale pink, pale brown, or pale yellow, as well as dirt in any other color.

Modification Example 1

The photographing system (S) according to modification example 1 executes photographing with use of the camera (70) based on manual operation of the communication terminal (90), as well as periodically executes photographing based on timer setting by the photographing control unit (83). Periodical photographing is executed exemplarily once a day at predetermined time. Also upon such periodical photographing, similarly to photographing by manual operation of the communication terminal (90), the lighting device (72) operates and obtained is image data of the photographing target in the drain pan (50) (the inner surface of the drain pan (50) and the intake portion (61) of the drain pump (60)).

The communication unit (87) transmits the image data thus obtained to the cloud server (95). The cloud server (95) periodically receives image data via the network (N). The cloud server (95) monitors periodical reception of image data. If not periodically receiving image data, the cloud server (95) transmits information indicating abnormality occurring in the photographing system (S) to the communication terminal (90) in order to notify the user of the abnormality.

Modification Example 2

Figure 9:
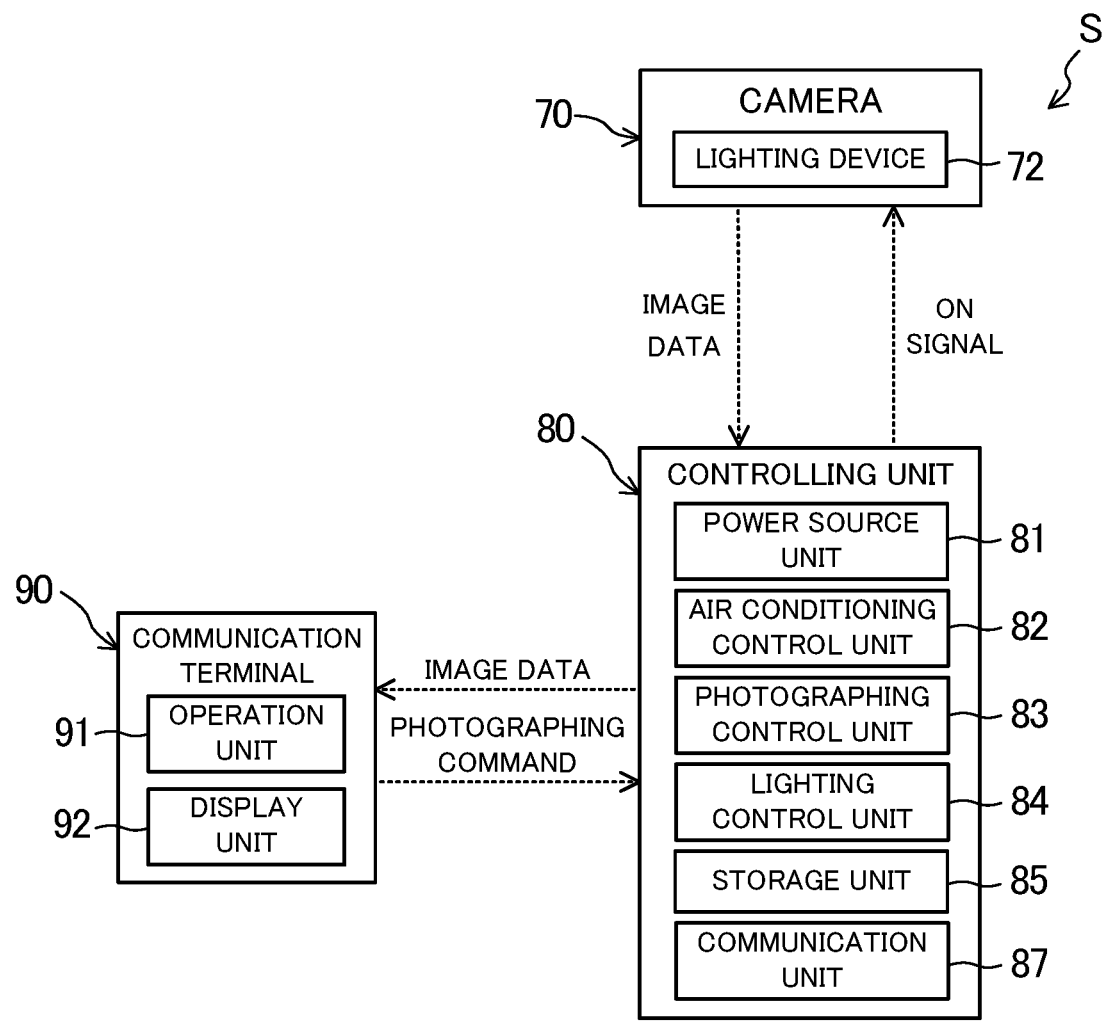
FIG. 9 is a block diagram depicting a schematic configuration of the photographing system according to modification example 2.

FIG. 9 depicts the photographing system (S) according to modification example 2, in which the communication unit (87) is connected to the communication terminal (90) by means of wireless communication. The wireless communication between the communication unit (87) and the communication terminal (90) adopts Bluetooth (registered trademark), the mobile high-speed communication technique (LTE), or the like. The communication unit (87) is configured to transmit and receive a signal to and from the communication terminal (90).

When the service provider or the user operates the communication terminal (90) to input a photographing command on the application software, the communication terminal (90) transmits the photographing command to the controlling unit (80). The photographing control unit (83) causes the camera (70) to photograph based on the photographing command received by the controlling unit (80). Image data obtained through the photographing is stored in the storage unit (85) and is transmitted to the communication terminal (90) via the communication unit (87). The photographing may alternatively be executed periodically based on timer setting by the photographing control unit (83). The service provider or the user can check, on the display unit (92), the image data received by the communication terminal (90).

Embodiment 2

Description is made to embodiment 2.

An air conditioner (10) according to embodiment 2 is different from that according to embodiment 1 in a basic configuration. The air conditioner (10) according to embodiment 2 introduces outdoor air and adjusts temperature and humidity of the air. The air conditioner (10) supplies the indoor space with the air thus treated as supply air (SA). The air conditioner (10) is of an outdoor air processing type. The air conditioner (10) includes a humidifier (45) configured to humidify air during winter and the like.

The air conditioner (10) is installed in a ceiling space or the like. As in embodiment 1, the air conditioner (10) includes an indoor unit (11) and the outdoor unit (not depicted). The indoor unit (11) and the outdoor unit are connected to each other via a refrigerant pipe to constitute a refrigerant circuit.

<Indoor Unit>

Figure 10:
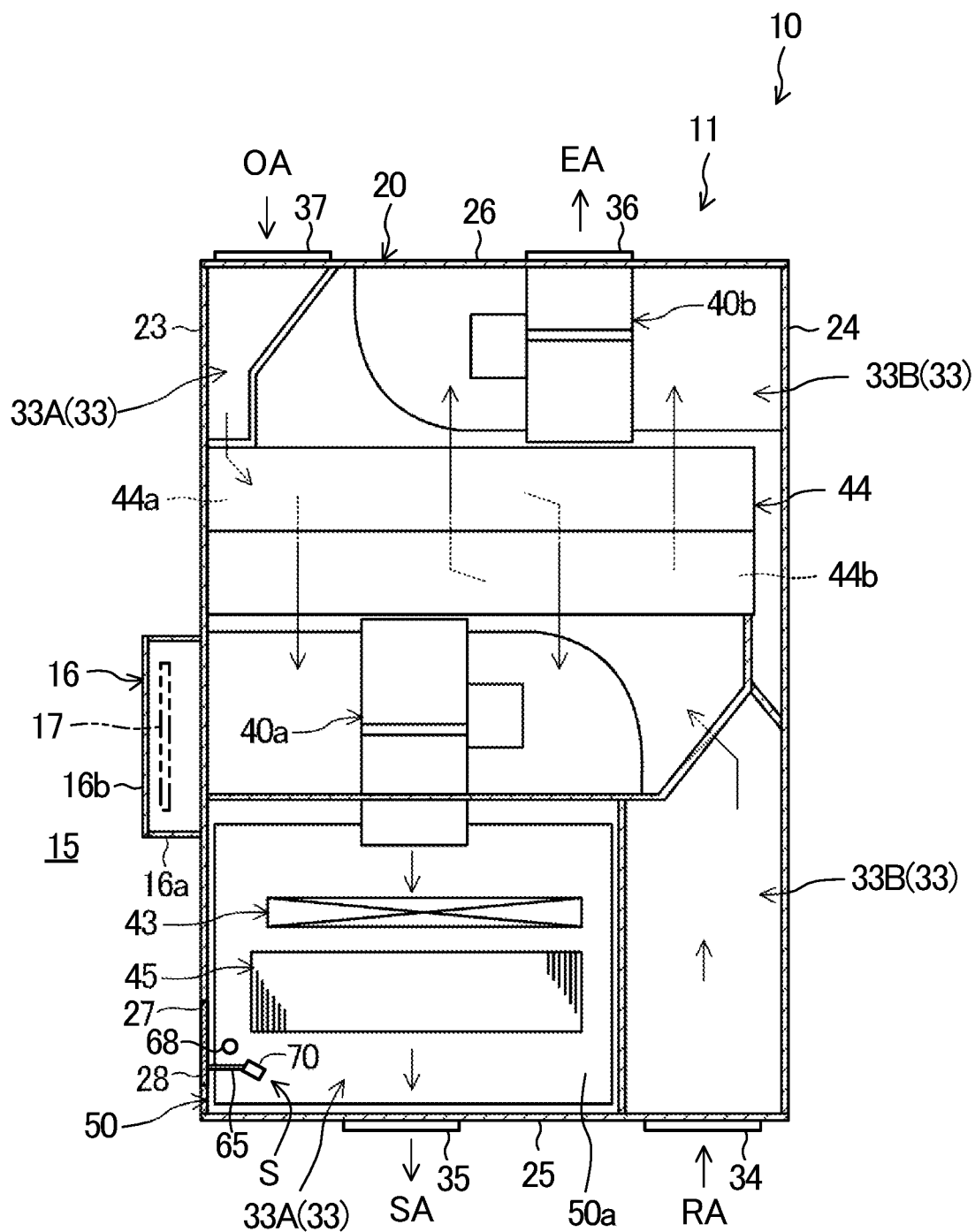
FIG. 10 is a plan view depicting an internal structure of an air conditioner according to embodiment 2.
Figure 11:
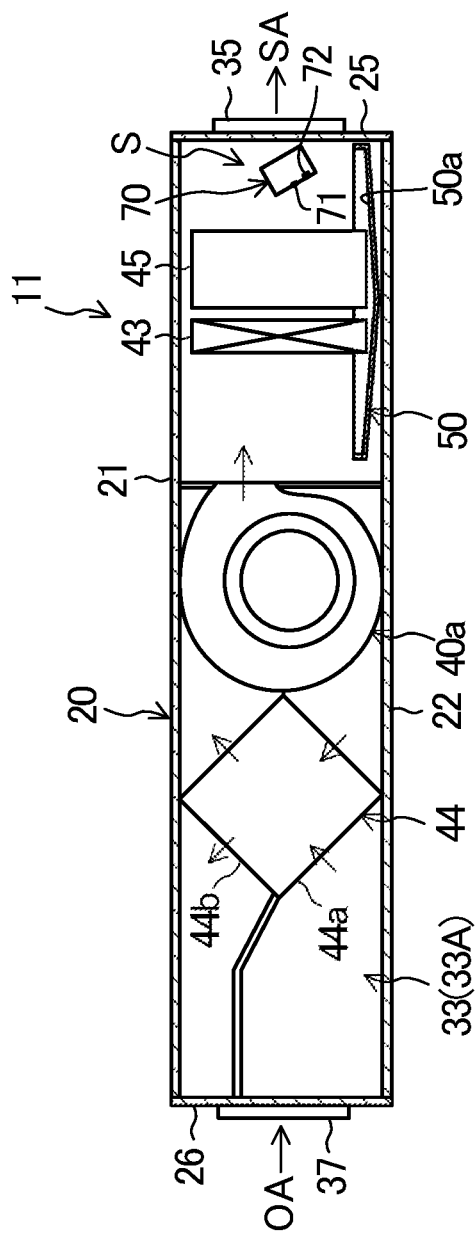
FIG. 11 is a longitudinal sectional view depicting the internal structure of the air conditioner according to embodiment 2.

As depicted in FIG. 10 and FIG. 11, the indoor unit (11) includes a casing (20), a supply fan (40a), an exhaust fan (40b), an indoor heat exchanger (43), a total heat exchanger (44), the humidifier (45), a drain pan (50), an electric component box (16), and a photographing system (S).

The casing (20) has a rectangular parallelepiped hollow box shape. Similarly to embodiment 1, the casing (20) according to embodiment 2 includes a top panel (21), a bottom plate (22), a front panel (23), a rear panel (24), a first side plate (25), and a second side plate (26).

The front panel (23) faces a maintenance space (15). The front panel (23) has a front side provided with the electric component box (16). The front panel (23) is provided with an inspection port (27). The inspection port is positioned correspondingly to the humidifier (45) and the drain pan (50). The inspection port (27) is detachably provided with an inspection lid (28). The service provider or the like detaches the inspection lid (28) to visually recognize an interior of the casing (20) via the inspection port (27).

The first side plate (25) is provided with an inside air port (34) and an air supply port (35). The inside air port (34) is connected with an inside air duct (not depicted). The inside air duct has an inflow end communicating with an indoor space. The air supply port (35) is connected with an air supply duct (not depicted). The air supply duct has an outflow end communicating with the indoor space.

The second side plate (26) is provided with an air exhaust port (36) and an outside air port (37). The air exhaust port (36) is connected with an air exhaust duct (not depicted). The air exhaust duct has an outflow end communicating with an outdoor space. The outside air port (37) is connected with an outside air duct (not depicted). The outside air duct has an inflow end communicating with the indoor space.

The casing (20) is provided therein with a supply air flow path (33A) and an exhaust air flow path (33B). The supply air flow path (33A) extends from the outside air port (37) to the air supply port (35). The exhaust air flow path (33B) extends from the inside air port (34) to the air exhaust port (36).

<Total Heat Exchanger>

The total heat exchanger (44) has a laterally long quadrangular prism shape. The total heat exchanger (44) is exemplarily constituted by two types of sheets alternately stacked in a horizontal direction. A first one of the two types of sheets is provided with a first passage (44a) communicating with the supply air flow path (33A). A second one of the two types of sheets is provided with a second passage (44b) communicating with the exhaust air flow path (33B).

The two types of sheets are each made of a material having a heat transfer property and hygroscopicity. The total heat exchanger (44) exchanges sensible heat between air flowing in the first passage (44a) and air flowing in the second passage (44b). The total heat exchanger (44) exchanges latent heat between the air flowing in the first passage (44a) and the air flowing in the second passage (44b).

<Supply Fan>

The supply fan (40a) is disposed on the supply air flow path (33A). Exactly, the supply fan (40a) is disposed between the first passage (44a) of the total heat exchanger (44) and the indoor heat exchanger (43) on the supply air flow path (33A). The supply fan (40a) sends air in the supply air flow path (33A).

<Exhaust Fan>

The exhaust fan (40b) is disposed on the exhaust air flow path (33B). Exactly, the exhaust fan (40b) is disposed downstream of the second passage (44b) of the total heat exchanger (44) on the exhaust air flow path (33B). The exhaust fan (40b) sends air in the exhaust air flow path (33B).

<Indoor Heat Exchanger>

The indoor heat exchanger (43) is disposed close to the front panel (23) on the supply air flow path (33A). The indoor heat exchanger (43) is exemplarily of a fin and tube type.

<Humidifier>

Figure 12:
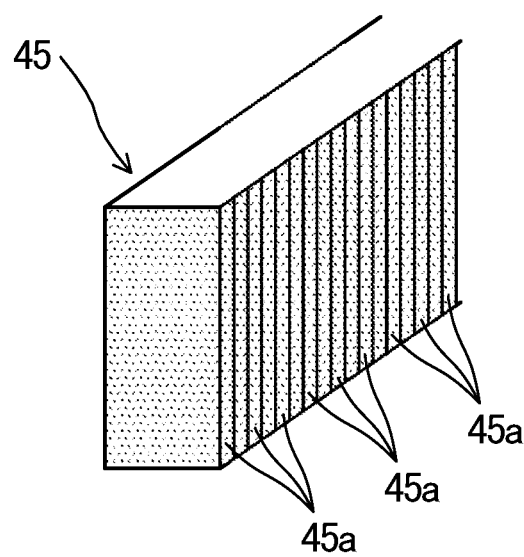
FIG. 12 is an enlarged pattern perspective view of a humidifier according to embodiment 2.

The humidifier (45) is disposed close to the front panel (23) on the supply air flow path (33A). The humidifier (45) is disposed downstream of the indoor heat exchanger (43) on the supply air flow path (33A). As depicted in FIG. 12, the humidifier (45) includes a plurality of water absorptive members (45a) (so-called humidifying elements) extending vertically and aligned horizontally. The water absorptive members (45a) are supplied with water from a water tank (not depicted). In the humidifier (45), evaporated water is provided into air flowing around the water absorptive members (45a). This humidifies air flowing in the supply air flow path (33A).

<Drain Pan>

As depicted in FIG. 11, the drain pan (50) is disposed below the humidifier (45). The drain pan (50) receives water flowing out of the humidifier (45). The drain pan (50) has a lower portion provided with a drain port (68) (see FIG. 9). The drain pan (50) is made of a metal such as stainless steel. The drain pan (50) has a surface in silver. A bottom surface (50a) of the drain pan (50) and the water absorptive members (45a) of the humidifier (45) are included in a photographing target of a camera (70).

<Electric Component Box>

As depicted in FIG. 10, the electric component box (16) is disposed substantially at a center portion in a front surface of the front panel (23). The electric component box (16) accommodates electric components similar to those according to embodiment 1.

<Photographing System>

The photographing system (S) includes the camera (70), a lighting device (72), a controlling unit (80), and a communication terminal (90). The camera (70) is accommodated in the casing (20). The controlling unit (80) is constituted by the printed circuit board (17) disposed in the electric component box (16). The camera (70) and the controlling unit (80) are connected via a cable. The communication terminal (90) is owned by the service provider or the user.

The camera (70) is attached to the inspection lid (28) by means of a stay (65). The stay (65) is provided on a rear surface of the inspection lid (28). The stay (65) has a proximal end fixed to the rear surface of the inspection lid (28) by welding or the like. The camera (70) is detachably attached to a distal end of the stay (65). When the inspection lid (28) is attached to the inspection port (27), the camera (70) has a photographing posture directed obliquely downward toward the second side plate (26).

The camera (70) includes a lens (71). The lens (71) of the camera (70) having the photographing posture is directed to the interior of the drain pan (50). The camera (70) captures at least the bottom surface (50a) in an inner surface of the drain pan (50). The camera (70) further captures the water absorptive members (45a) of the humidifier (45). Image data obtained through photographing with use of the camera (70) includes the bottom surface (50a) of the drain pan (50) and the water absorptive members (45a) of the humidifier (45).

The lighting device (72) is provided integrally with the camera (70). The lighting device (72) applies visible light to the photographing target at least upon photographing with use of the camera (70). The lighting device (72) has a position and an angle set to apply visible light to photographing regions of the drain pan (50) and the humidifier (45) when the camera (70) has the photographing posture. The lighting device (72) is a white LED as in embodiment 1. The lighting device (72) applies visible light having a maximum peak wavelength in a wavelength band from 400 nm to 500 nm (short wavelength band).

The controlling unit (80) and the communication terminal (90) are configured similarly to those in the photographing system (S) according to embodiment 1.

Similarly to embodiment 1, the air conditioner (10) according to embodiment 2 photographs the inner surface of the drain pan (50) with use of the camera (70) in a lighting environment where the lighting device (72) applies visible light having the maximum peak wavelength in the short wavelength band. In image data obtained through such photographing, a portion including dirt in pale pink, pale brown, or pale yellow is lower in brightness than a remaining portion not including such dirt, and the portion having the dirt has a relatively deep color. It is thus easy to specify a dirtied state of the surface of the drain pan (50) based on the image data obtained through photographing with use of the camera (70).

In the air conditioner (10) according to embodiment 2, the camera (70) captures the water absorptive members (45a) of the humidifier (45). The water absorptive members (45a) are likely to have dirt in pale yellow due to deposition of minerals or the like and bacteria propagation. The dirt in pale yellow adhering to the water absorptive members (45a) also absorbs most of maximum peak wavelength components of the visible light emitted from the lighting device (72). In image data obtained through photographing, a portion including the dirt accordingly has a relatively deep color. It is thus possible to grasp a dirtied state of the water absorptive members (45*a*) along with the dirtied state of the inner surface of the drain pan (50) based on the image data.

Embodiment 3

Description is made to embodiment 3.

An air treatment device according to embodiment 3 is an air conditioner (10) that is hung from a ceiling or is embedded in the ceiling. The air conditioner (10) includes an indoor unit (11) and an outdoor unit (not depicted). The indoor unit (11) and the outdoor unit are connected to each other via a refrigerant pipe to constitute a refrigerant circuit. The indoor unit (11) is installed behind a ceiling.

Figure 13:
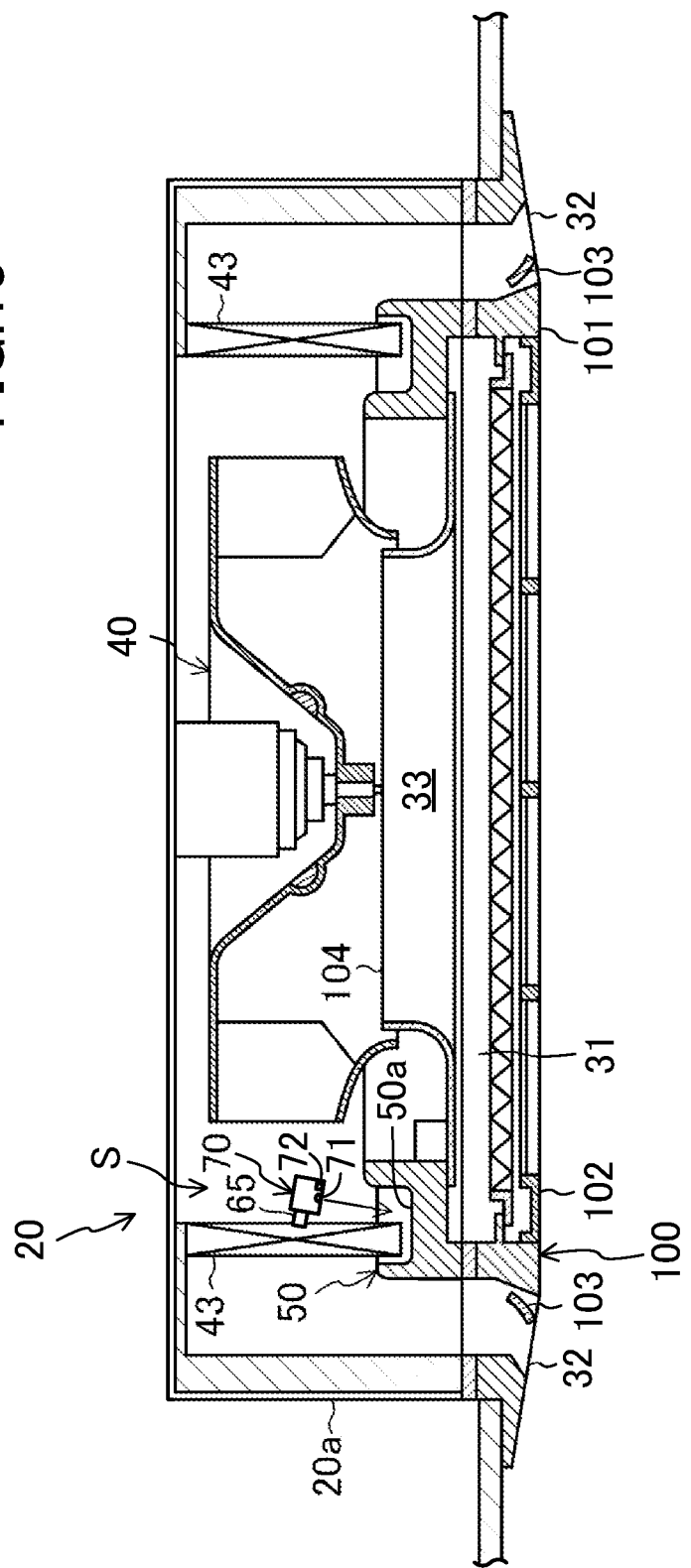
FIG. 13 is a longitudinal sectional view depicting an internal structure of an air conditioner according to embodiment 3.

As depicted in FIG. 13, the indoor unit (11) includes a casing (20). The casing (20) includes a casing body (20*a*) and a panel (100). The casing body (20*a*) has a rectangular box shape provided with a lower opened surface. The panel (100) is detachably attached to the opened surface of the casing body (20*a*). The panel (100) includes a panel body (101) having a rectangular frame shape and an intake grill (102) provided at a center of the panel body (101).

The center of the panel body (101) is provided with a single intake port (31). The intake grill (102) is attached to the intake port (31). The panel body (101) has four side edges each provided with a blow-out port (32). The blow-out ports (32) extend along the four side edges of the panel body (101). Each of the blow-out ports (32) is provided therein with an airflow direction adjusting blade (103).

The casing body (20*a*) is provided therein with a bell mouth (104), a fan (40), an indoor heat exchanger (43), and a drain pan (50). The bell mouth (104) and the fan (40) are disposed above the intake grill (102). The indoor heat exchanger (43) is disposed to surround the fan (40). The indoor heat exchanger (43) is of a fin and tube type. The drain pan (50) is positioned under the indoor heat exchanger (43).

A lens (71) of a camera (70) is directed to an interior of the drain pan (50). The camera (70) captures at least the bottom surface (50*a*) in an inner surface of the drain pan (50). Other configurations in a photographing system (S) are similar to those according to embodiment 1, inclusive of a controlling unit and a communication terminal (not depicted). Similarly to embodiment 1 and embodiment 2, embodiment 3 exhibits an effect of being easy to specify a dirtied state of the inner surface of the drain pan (50) based on image data obtained through photographing with use of the camera (70).

Other Embodiments

Any one of the above embodiments may provide any of the following configurations.

The tray as a photographing target may alternatively be a component other than the drain pan (50) if the component is configured to receive water. The tray may be a water receiver installed under a water tank for humidification. The water receiver is supplied with water in the water tank. The water in the water receiver is used to humidify air. The water tank and the water receiver are mounted to an air cleaner, a humidity controller, or the like.

The lighting device (72) may alternatively be provided separately from the camera (70).

The white LED used as the lighting device (72) may be alternatively of a type combining a red LED, a green LED, and a blue LED. In this case, the lighting device may be configured to apply visible light having a maximum peak wavelength in a short wavelength band by providing the blue LED with emission intensity higher than emission intensity of the red LED and the green LED, or by attenuating light having a wavelength longer than 500 nm with use of a filter.

The lighting device (72) may alternatively be a blue LED configured to emit blue light in the short wavelength band. The lighting device (72) has only to be configured to apply visible light having a maximum peak wavelength in a wavelength band from 400 nm to 500 nm.

The air treatment device may alternatively be replaced with any other device including a casing allowing air to flow therein. The air treatment device may be a humidity controller configured to control humidity of air in a target space. The air treatment device may be a ventilator configured to ventilate the target space. The air treatment device may be an air cleaner configured to clean air in the target space.

The embodiments and the modification examples have been described above. Various modifications to modes and details will be apparently available without departing from the object and the scope of the claims. The embodiments and the modification examples may be combined or replaced appropriately unless affecting target functions of the present disclosure.

INDUSTRIAL APPLICABILITY

As described above, the present disclosure is useful in an air treatment device.

REFERENCE SIGNS LIST

S: photographing system
RA: indoor air
SA: supply air
10: air conditioner (air treatment device)
11: indoor unit
15: maintenance space
16: electric component box
16*a*: box body
16*b*: electric component lid
17: printed circuit board
20: casing
20*a*: casing body
21: top panel
22: bottom plate
23: front panel
23*a*: opening
24: rear panel
25: first side plate
26: second side plate
27: inspection port
28: inspection lid
31: intake port
32: blow-out port
33: air flow path
40: fan
41: shaft
42: motor
43: indoor heat exchanger
44: total heat exchanger
45: humidifier
45*a*: water absorptive member
50: drain pan (tray)
50*a*: bottom surface
50*b*: side surface
51: bottom plate portion 53: concave portion
56: first side plate
57: second side plate
58: third side plate
58a: inspection window
59: fourth side plate
60: drain pump
61: intake portion
62: water intake port
63: drain pipe
65: stay
70: camera (photographing device)
71: lens
72: lighting device
80: controlling unit
81: power source unit
82: air conditioning control unit
83: photographing control unit
84: lighting control unit
85: storage unit
87: communication unit
90: communication terminal
95: cloud server
100: panel
101: panel body
102: intake grill
103: airflow direction adjusting blade
104: bell mouth

The invention claimed is:

1. An air treatment device comprising:
a casing;
a tray provided in the casing and configured to receive water;
a camera configured to photograph a photographing target including an inner surface of the tray to obtain image data; and
a light emitting diode configured to apply, to the photographing target of the camera, visible light having a maximum peak wavelength in a wavelength band from 400 nm to 500 nm,
wherein
the inner surface of the tray is white, such that an image, captured by the camera, of a portion of the inner surface having no dirt adhered to the inner surface is relatively high in brightness compared to a portion of the inner surface having dirt adhering to the inner surface.

2. The air treatment device according to claim 1, wherein the inner surface of the tray includes a bottom surface and a side surface, and the camera photographs the bottom surface.

3. The air treatment device according to claim 2, wherein the bottom surface of the tray is provided with a concave portion concaved downward, and
the camera photographing device photographs the concave portion.

4. The air treatment device according to claim 3, further comprising:
a pump disposed above the tray and configured to exhaust water received by the tray, and the pump is at least partially included in the photographing target of the camera.

5. The air treatment device according to claim 4, wherein the light emitting diode is a white light emitting diode.

6. The air treatment device according to claim 3, wherein the light emitting diode is a white light emitting diode.

7. The air treatment device according to claim 2, further comprising:
a pump disposed above the tray and configured to exhaust water received by the tray, and the pump is at least partially included in the photographing target of the camera.

8. The air treatment device according to claim 7, wherein the light emitting diode is a white light emitting diode.

9. The air treatment device according to claim 2, wherein the light emitting diode is a white light emitting diode.

10. The air treatment device according to claim 1, further comprising:
a pump disposed above the tray and configured to exhaust water received by the tray, and the pump is at least partially included in the photographing target of the camera.

11. The air treatment device according to claim 10, wherein the light emitting diode is a white light emitting diode.

12. The air treatment device according to claim 1, wherein the light emitting diode is a white light emitting diode.

* * * * *